(12) United States Patent
Hu

(10) Patent No.: US 8,632,743 B2
(45) Date of Patent: Jan. 21, 2014

(54) SYNTHESIS OF CARBON NITRIDES FROM CARBON DIOXIDE

(75) Inventor: Yun Hang Hu, Hancock, MI (US)

(73) Assignee: Michigan Technological University, Houghton, MI (US)

( * ) Notice: Subject to any disclaimer, the term of this patent is extended or adjusted under 35 U.S.C. 154(b) by 57 days.

(21) Appl. No.: 12/984,313

(22) Filed: Jan. 4, 2011

(65) Prior Publication Data

US 2011/0163264 A1 Jul. 7, 2011

Related U.S. Application Data

(60) Provisional application No. 61/292,017, filed on Jan. 4, 2010.

(51) Int. Cl.
*C01B 21/082* (2006.01)
*C01C 3/00* (2006.01)
*C01C 3/08* (2006.01)

(52) U.S. Cl.
USPC .......................... 423/384; 423/364; 423/371

(58) Field of Classification Search
USPC ......... 423/351, 353–355, 358, 364, 368, 384, 423/406, 439, 371; 252/182.32, 182.34
See application file for complete search history.

(56) References Cited

U.S. PATENT DOCUMENTS

| 6,428,762 B1 * | 8/2002 | Khabashesku et al. ....... 423/384 |
| 2008/0026929 A1 * | 1/2008 | Jensen et al. .................... 501/87 |
| 2011/0163264 A1 | 7/2011 | Hu |

OTHER PUBLICATIONS

Jacobson, C.A, Encyclopedia of Chemical Reactions, 1951, vol. IV, p. 457.*
Jacobson, C.A, Encyclopedia of Chemical Reactions, 1948, vol. II, p. 365.*
Sikder and Kumar, Superhard Coatings in C-B-N Systems: Growth and Characterization, Handbook of Thin Film Materials, vol. 2: Characterization and Spectroscopy of Thin Films, 2002, pp. 159-166.*
Aresta, M, et al., J. Mol. Catal. A Chem., 182, 399(2002).
Auerbach, D.I., et al., Assess. 2, 333(1997).
Bassetti, A., et al., Progress in advanced materials and processes materials science forum, 453-454, 205(2004).
Collin, J.P., et al., Coord. Chem. Rev., 93, 245(1989).
Down, M. G., et al., J. C. S. Chem. Comm., 52(1978).
Gates, B.C., Catalytic chemistry, Wiley, New York, 1992.
Goglio, G., et al., Mater. Sci. Eng. R, 58, 195(2008).
Gruber, N., et al., Nature 451, 293(2008).
Guo, Q. X., et al., Solid State Commun. 132, 369(2004).
Gupta, M., et al., J Alloys and Compounds 446, 319(2007).
Hoist, J. R., et al., J. Amer. Chem. Soc., 130, 7373(2008).
Hu, Y H, et al., Advances in catalysis, 48, 297(2004).
Inoue, S., Copolymerization of carbon dioxide and epoxide, in "Carbon dioxide as a source of carbon", M. Aresta and G. Forti, Eds., NATO-ASI series C, 206, 331(1987).
Jacobson, C.A., Encyclopedia of Chemical Reactions (1951) vol. IV, p. 457.

(Continued)

*Primary Examiner* — Steven Bos
*Assistant Examiner* — Justin Bova
(74) *Attorney, Agent, or Firm* — Michael Best & Friedrich LLP

(57) ABSTRACT

Provided are methods of converting carbon dioxide to carbon nitrides. In a first reaction, carbon dioxide may be reacted with metal nitrides, such as $Li_3N$, to form carbon nitrides in a fast and exothermic reaction. Also provided are methods of using product metal cyanamides from the first reaction to subsequently generate additional carbon nitrides.

23 Claims, 5 Drawing Sheets

(56) References Cited

OTHER PUBLICATIONS

Jacobson, C.A., Encyclopedia of Chemical Reactions (1948) vol. II, p. 365.
JCPDS data base, International center for diffraction Data, PCPDWIN, V. 2.2, No. 70-0648 (2001).
Kendall, J. L., et al., Polymerizations in supercritical carbon dioxide, Chem. Rev., 99, 543(1999).
Khabashesku, N., et al., Chem. Mater. 12, 3264(2000).
Kintisch, E., Report backs more projects to sequester CO2 from coal. Science 315, 1481(2007).
Kintisch, E., Science 315, 1481(2007).
Komatsu, T., J. Mater. Chem. 11, 799(2001).
Kouvetakis, J., et al., Chem Mater, 6, 811(1994).
Kroll, P., et al., J. Am. Chem. Soc., 121, 4696(1999).
Lal, R., Phil. Trans. R. Soc. B, 363, 815(2008).
Liu, A. Y., et al., Science, 245, 841(1989).
Lowther, J. E., Phys. Rev. B, 59, 11683(1999).
Marton, D., et al., Phys. Rev. Lett., 73, 118(1994).
Miller, D. R., et al., J. Mater. Chem. 12, 2463(2002).
Muhl, S., et al., Diamond Relat. Mater., 8, 1809(1999).
Murty, B.S., et al., Internaion Materials Reviews, 43, 101(1998).
Nesting, D. C., et al., Chem. Mater, 8, 1535(1996).
Reay, D., et al., Greenhouse gas sinks, CABI Books, 2007.
Ricci, M., in Recovery and utilization of carbon dioxide., ed. M. Aresta, Kluwer Academic Publishers, The Netherlands, 2003, pp. 395(2003).
Sikder et al., "Superhard coatings in C-B-N systems: growth and characterization," Handbook of Thin Film Materials, vol. 2: Characterization and Spectroscopy of Thin Films (2002) 159-166.
Teter, D. M., et al., Science 271, 53(1996).
Tollefson, J., Nature 450, 327(2007).
Tomasko, D. L., et al., A review of CO2 applications in the processing of polymers, Ind. Eng. Chem. Res., 42, 6431(2003).
Tragl, S., et al., Solid State Communication, 141, 519(2007).
Turner, J., et al., Int. J. Energy Res., 32, 379(2008).
Wang, P.N., et al., Phy Rev B 59, 13347(1999).
Wei, J., J. Appl. Phys., 89, 4099(2001).
Wixom, M. R., J. Am. Ceram Soc, 73, 1973(1990).
Yen, T. Y., et al., Solid State Commun, 95, 281(1995).
Yu, K.M., et al., Phys. Rev. B 49, 5034(1994).
Zhang, Z. H., et al., J. Am. Chem. Soc., 123, 7788(2001).
Zhao, J. P., et al., J. Appl. Phys., 89, 1580(2001).
Ziessel, R., et al., Helv. Chim. Acta, 69, 1065(1986).
Zimmerman, J. L., et al., Nano Lett. 1, 731(2001).

* cited by examiner

US 8,632,743 B2

SYNTHESIS OF CARBON NITRIDES FROM CARBON DIOXIDE

CROSS-REFERENCE TO RELATED APPLICATIONS

This application claims the benefit of priority to U.S. Provisional Patent Application No. 61/292,017, filed Jan. 4, 2010, which is incorporated herein by reference in its entirety.

INTRODUCTION

As a result of the burning of fossil fuels and carbon emissions from land-use change, atmospheric carbon dioxide ($CO_2$) has increased by 30% since the pre-industrial times. This increase in atmospheric $CO_2$ has been identified as the primary cause for the observed warming over the past century, particularly the past 30 years. The recovery and disposal of $CO_2$ from point-continuous sources, such as power plants and industries, could markedly reduce $CO_2$ emission in the atmosphere. The conversion of $CO_2$ into useful materials may be an effective approach for both reducing $CO_2$ and synthesizing new materials.

Several conventional technological options for sequestration of atmospheric $CO_2$ into one of the other global pools include oceanic injection, geological injection, and scrubbing and mineral carbonation. However, these options are slow and costly, and they may have adverse effects on the environment. While carbon dioxide has found a growing application as a fluid in dry-cleaning, refrigerators, air conditioners, fire-extinguishers, separation techniques, water treatment, and food-industry, in these processes $CO_2$ is not converted into other chemicals. Rather, it is recovered at the end of the application, and hence, these processes currently do not help sequester atmospheric carbon dioxide. Conventional industrial applications of $CO_2$ as a feedstock for chemical processes are limited. Currently, the largest industrial conversion of $CO_2$ is the production of urea ($H_2NCONH_2$) via the reaction of $CO_2$ and ammonia (Equation 1):

$$2NH_3 + CO_2 \rightarrow H_2NCONH_2 + H_2O \tag{1}$$

In the past 30 years, research and development for the activation of $CO_2$ have been focused on carboxylation and carbonation of organic substrates, oxiran co-polymerization with $CO_2$, synthesis of energy-rich $C_1$ compounds, photochemical conversion, and electrochemical reduction. However, the high energy cost or low efficiencies of those processes constitute a critical restriction for their commercialization.

SUMMARY

In certain embodiments, provided are methods for producing a carbon nitride from carbon dioxide. The methods may comprise reacting carbon dioxide with a metal nitride to produce a first carbon nitride of the formula $C_xN_y$, wherein each x and y is independently an integer. The metal nitride may comprise $Li_3N$. The first carbon nitride may comprise $C_3N_4$.

In other embodiments, provided are methods for producing a carbon nitride from carbon dioxide comprising reacting carbon dioxide with a metal nitride to produce a $Li_2CN_2$ and a first carbon nitride of the formula $C_xN_y$, and reacting the $Li_2CN_2$ with $C_3N_3Cl_3$ to produce a second carbon nitride of the formula $C_xN_y$, wherein each x and y is independently an integer. The metal nitride may comprise $Li_3N$. The first and second carbon nitrides may each comprise $C_3N_4$.

In another embodiment, the invention provides a carbon nitride generated by the reaction of carbon dioxide with a metal nitride.

Other aspects of the invention will become apparent by consideration of the detailed description and accompanying drawings.

DETAILED DESCRIPTION

Liu and Cohen (*Science*, 1989, 245, 841, incorporated by reference herein in its entirety) predicted that the bulk modulus of $\beta$-$C_3N_4$ carbon nitride material with the hexagonal $\beta$-$Si_3N_4$ structure would be compared (at 427 GPa) to that of diamond (442 GPa). Five different structures of carbon nitride with $C_3N_4$ stoichiometry have been predicted: one is two-dimensional graphitic g-$C_3N_4$ and four are three-dimensional carbon nitrides, namely, $\alpha$-$C_3N_4$, $\beta$-$C_3N_4$, cubic $C_3N_4$, and pseudocubic $C_3N_4$. Except for two-dimensional graphitic g-$C_3N_4$, the other four $C_3N_4$ phases are predicted to be superhard materials with structures and properties similar to those of diamond and $\beta$-$Si_3N_4$.

Numerous attempts have been made to synthesize tetrahedrally bonded carbon nitride materials using a variety of physical techniques such as sputtering, precursor technique, ion-beam deposition, pulsed laser-induced liquid-solid interfacial reaction, dc sputtering, shockwave compression of carbon-nitride precursor, ion-beam assisted pulsed laser deposition, nitrogen ion implantation into diamond surface, and high pressure. However, in most of these cases, thin films or amorphous particles with much lower nitrogen content than $C_3N_4$ were obtained.

Figure 1:
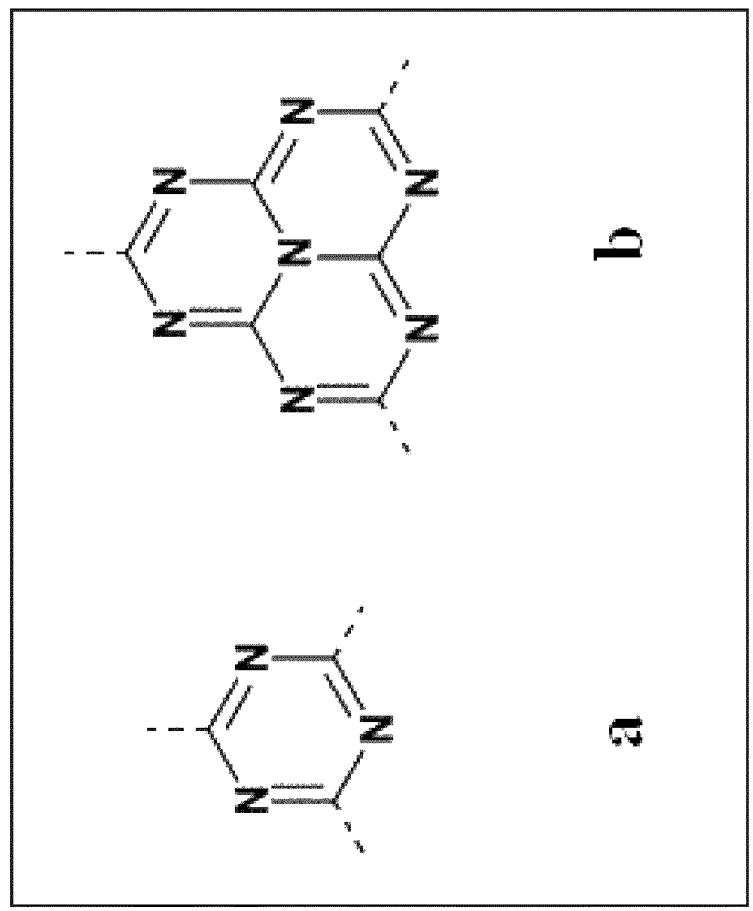
FIG. 1 illustrates the chemical structures of (a) triazine and (b) heptazine precursors.

Conventional methods for chemically synthesizing $CN_x$ carbon nitride materials often utilized reactive precursors containing prebonded C—N core structures, such as triazine rings ($C_3N_3$) and related heterocyclic arenas (FIG. 1). For example, from $C_3N_6H_6$ and $C_3N_3Cl_3$, Zhang et al. (*J. Am. Chem. Soc.*, 2001, 123, 7788, incorporated by reference herein in its entirety) prepared a well-crystallized nitrogen-rich carbon nitride with a stoichiometry of $C_6N_9H_3$ at temperatures of 500-550° C. and high pressures of 1-1.5 GPa via the reaction according to Equation 2:

$$nC_3N_6H_6 + nC_3N_3Cl_3 \rightarrow nC_6N_9H_3 + 3nHCl \tag{2}$$

Khabashesku and his coworkers (*Chem. Mater.* 2000, 12, 3264, incorporated by reference herein in its entirety) successfully synthesized carbon nitrides of the correct $C_3N_4$ stoichiometry and a graphite-like structure by a high-temperature reaction (at 500° C.) using cyanuric chloride (or fluoride) as an s-triazine building block and lithium nitride (Li$_3$N) as a nitrogen-bridging agent via the reaction according to Equation 3:

$$C_3N_3Cl_3 + nLi_3N \rightarrow nC_3N_4 + 3nLiCl \quad (3)$$

Conventional methods for CO$_2$ conversion have been focused on (1) the hydrogenation of CO$_2$ to new organic compounds and (2) reactions of CO$_2$ with organic compounds to form new function groups. Conventional methods for the synthesis of carbon nitrides have included reactive precursors containing pre-bonded C—N core structures, such as triazine rings (C$_3$N$_3$), as C and N sources, which are more expensive than CO$_2$. To date, however, there has not been any attempt to use CO$_2$ as a C-source for carbon nitride synthesis.

The invention provides an easy, energy efficient, exothermic, and cost-effective method of converting carbon dioxide, a harmful greenhouse gas, to useful materials. CO$_2$ may be reacted with metal nitrides, such as Li$_3$N, to form carbon nitrides. Lithium nitride (Li$_3$N) may be used as a reactive N-source for material synthesis. If Li$_3$N is employed as a N-source for C$_3$N$_4$ formation from CO$_2$, the reaction can be expressed according to Equation 4:

$$3CO_2(g) + 4Li_3N(s) \rightarrow C_3N_4(s) + 6Li_2O(s) \quad (4)$$

From thermodynamic calculations, it was discovered that the reaction enthalpy and Gibbs free energy are about −853 to about −967 kJ/mol and about −752 to about −896 kJ/mol, respectively. The very negative free energy suggested it may be a thermodynamically favorable reaction. The very negative enthalpy suggested the reaction may be exothermic and economic. As shown further in Example 1, it was discovered that the reaction between CO$_2$ and Li$_3$N may be a feasible approach for carbon nitride synthesis. Furthermore, experiments (Example 1) showed that the reaction can produce two types of C—N containing products: amorphous graphite-like carbon nitride and crystal lithium cyanamide.

In certain embodiments, provided are processes for converting CO$_2$ into carbon nitride via direct production from the reaction of CO$_2$ and a metal nitride such as Li$_3$N. In other embodiments, provided are processes for converting CO$_2$ into carbon nitrides via indirect synthesis with lithium cyanamide (Li$_2$CN$_2$).

Direct Process

In certain embodiments, provided are methods of producing a carbon nitride from carbon dioxide. The methods may comprise reacting carbon dioxide with a metal nitride to produce a first carbon nitride. Carbon nitrides may be directly synthesized from CO$_2$ and lithium nitride (or other metal nitrides) according to Equation 5:

$$CO_2 + Li_3N \text{(or other metal nitrides)} \rightarrow C_xN_y \text{(particularly } C_3N_4\text{)} + Li_2O \quad (5)$$

As used herein, "carbon nitride" refers to a solid compound containing carbon and nitrogen. Carbon nitrides may be of the formula C$_x$N$_y$, wherein each x and y is independently an integer, for example, from 1 to 20. Suitably, the values of x and y may be selected from x=3 and y=4, x=4 and y=3, x=14 and y=9, and x=10 and y=3. Examples of carbon nitrides formed may include, but are not limited to, C$_3$N$_4$, C$_4$N$_3$, C$_{14}$N$_9$, and C$_{10}$N$_3$.

As shown in Example 1, the reaction (Equation 5) is thermodynamically favorable and fast at temperatures of about 350° C. or above. Under these conditions, the C—N containing products may include amorphous carbon nitride and lithium cyanamide. The C/N ratios of the obtained carbon nitrides may be dependent on the reaction conditions. As such, changing reaction conditions, such as temperature and/or pressure, may facilitate production of varying compositions of carbon nitrides. For example, the C/N ratios may be 1.33 (corresponding to C$_4$N$_3$), 1.533 (corresponding to C$_{14}$N$_9$), or 3.394 (corresponding to C$_{10}$N$_3$) for amorphous carbon nitrides obtained from the CO$_2$ and Li$_3$N reaction at 350° C., 380° C., and 400° C., respectively. Not intending to be bound by theory, it may be possible that the N of the carbon nitrides may exchange with CO$_2$ to form NO$_2$ at higher temperatures. A lower reaction temperature may generate a carbon nitride with a greater N-content and may allow one to tune the carbon nitrides toward C$_3$N$_4$ stoichiometry. However, low reaction temperatures may have slow reaction rates for the reaction between CO$_2$ and Li$_3$N. To improve kinetics of the reaction, varied approaches may be employed as discussed below.

Nanoparticles of the metal nitrides, such as Li$_3$N, may be used to improve the kinetics of the reaction. Nanoparticles have large surface areas relative to volume, which enhance gas-solid reactions. Furthermore, Li$_3$N nanoparticles may have structure defects, which may result in greater reactivity than that of particles of perfect structure. Li$_3$N and other metal nitride nanoparticles may be prepared by means known by those of skill in the art including, but not limited to, high-speed ball milling. Ball-milling may create defects in the structure of Li$_3$N (or other metal nitrides), which as stated above, may have increase reactivity.

Catalysts may be applied to reduce reaction energy barriers and improve the reaction between carbon dioxide and metal nitride. Catalysts may be added to the reaction and include, but are not limited to, transition metals and anions. Anions include, but are not limited to, F$^-$, Cl$^-$, Br$^-$, I$^-$, and O$^{2-}$. Transition metals include, but are not limited to, Ni, Rh, Ru, and Pt, or combinations thereof. Main transition metals exhibit excellent activity to break the C—O bond of CO$_2$. Ni may further improve the kinetics of the reaction by enhancing the Li—N bond breaking of Li$_3$N. As such, transition metals may also be effective catalysts for the reaction between CO$_2$ and Li$_3$N. In other embodiments, catalysts may be doped into the metal nitrides, so that they can activate both CO$_2$ and the metal nitride. Transition-metal catalysts may be doped into Li$_3$N and other metal nitrides by any means known by those of skill in the art including, but not limited to, high-speed ball milling.

The amount of catalyst used in the reaction may be at least about 5%, at least about 8%, or at least about 20% by weight of the metal nitride. Suitably, the amount of catalyst used in the reaction may be at least about 0.001%, at least about 0.01%, at least about 0.1%, at least about 1%, or at least about 3% by weight of the metal nitride. The amount of catalyst used in the reaction may be at about 0 to about 90%, or about 0.1% to about 5% by weight of the metal nitride.

Li$_3$N may be prepared by any means known by those of skill in the art including, but not limited to, the reaction between Li metal and N$_2$. The reaction may be conducted at low temperatures, which may have industrial advantages. Other metal nitrides besides Li$_3$N may be suitably used according to the invention for the production of carbon nitrides from CO$_2$. Metal nitrides may include, but are not limited to, univalent metal nitrides (such as Li$_3$N), divalent metal nitrides (such as Mg$_3$N$_2$ and Ca$_3$N$_2$), and trivalent metal nitrides (such as AlN). These other metal nitrides may have different bond strengths of metal-N bonds than those of Li$_3$N, which may yield different performances for CO$_2$ conversion to carbon nitrides.

The reaction between metal nitride and CO$_2$ may be carried out in a reactor. The reactor may have an inside diameter of about 1 mm to about 20 m or more, about 2 mm to about 10 m, or about 4 mm to about 2 m. The reactor may be made of stainless steel or other suitable materials and located in a furnace. The reaction may occur under vacuum. Metal nitride samples ranging from about 0.01 g to about 200 kg or more, about 0.1 g to about 100 kg, or about 0.5 g to about 2 kg, may be loaded in the reactor. The metal nitride particle size may range between about 1 nm to about 1 cm in diameter, about 2 nm to about 0.5 cm in diameter, or about 10 nm to about 1 mm in diameter. At a selected temperature, $CO_2$ may be introduced into the reactor at a ratio not to exceed about 20 kg of $CO_2$ to about 2 kg of $Li_3N$. The $CO_2$ may be introduced into the reactor for a certain time, such as about 0.1 hour to several weeks, about 0.1 hour to 24 hours, or about 0.5 hours to about 6 hours. The reaction between $CO_2$ and metal nitride may occur at temperatures between about 0° C. and about 800° C., about 25° C. to about 700° C., or about 25° C. to about 600° C. As discussed above, low temperatures may be better for the formation of higher N-content carbon nitrides. As such, the temperature range of the reaction may be suitably started at room temperature and ended at about 600° C. The reaction between $CO_2$ and metal nitride may occur at pressures of about 0.1 atm to about 200 atm, about 0.5 atm to about 150 atm, or about 1 atm to about 100 atm. For reaction temperatures higher than about 650° C., a ceramic reactor may replace a stainless steel one.

The reaction between carbon dioxide and metal nitride may be monitored and reaction kinetics may be determined. The reaction between carbon dioxide and metal nitride may be monitored by observing pressure changes of $CO_2$ in a closed system. $CO_2$ pressure change during the reaction may be measured by any means known by those of skill in the art including, but not limited to, with a digital pressure gauge. The reaction between carbon dioxide and metal nitride may be monitored by observing the gas composition, that is, by using a volumetric method. Because $CO_2$ may have an exchange reaction with the nitrogen of the produced carbon nitrides to form $NO_2$, which can release into gas phase, an on-line mass spectrometer may be used to monitor the composition of gas phase. The reaction unit may be modified for the installation of an on-line mass spectrometer to monitor gas composition during the reaction. By combining gas pressure change with gas composition, the amount of consumed $CO_2$ during the reaction may be monitored and calculated. The relationship between the amount of consumed $CO_2$ and its reaction time may facilitate evaluation of reaction kinetics.

The carbon nitrides may be removed from other components. The components from the reaction (Equation 5) may be immersed, washed, or dissolved in a solvent, followed by separation. Suitable solvents according to the invention may comprise water. Suitable solvents according to the invention may comprise acid. Acids include, but are not limited to, HCl, $HNO_3$, and HF. Separation may include centrifugation separation. The resulting solid may be washed again with solvent. Any remaining solvent may be evaporated. The remaining solid product may be pure carbon nitrides.

The structures and compositions of solid products of the reactions may be analyzed. Solid products may be subjected to analysis by any means known by those of skill in the art. Analysis methods include, but are not limited to, element analysis and X-ray photoelectron spectroscopy (XPS) for composition evaluation, regular X-ray powder diffraction (XRD) for the analysis of crystal structures and compositions, Infrared spectroscopy for structures of both amorphous and crystal components, scanning electron microscopy (SEM) and transmission electron microscopy (TEM) for morphology and particle sizes, and nitrogen adsorption (at about 77 K) for BET surface area and pore size distribution measurements. Results from characterizations such as these may be correlated with the reaction conditions and kinetics, which may facilitate tuning of the reaction toward carbon nitride products with desirable compositions and structures.

Indirect Process $C_3N_4$ carbon nitrides may be generated via an indirect process: the reaction between $CO_2$ and lithium nitride via lithium cyanamide. For the indirect process, $CO_2$ and $Li_3N$ may be first converted into lithium cyanamide ($Li_2CN_2$) (Equation 6).

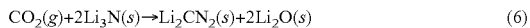
$$CO_2(g)+2Li_3N(s) \rightarrow Li_2CN_2(s)+2Li_2O(s) \qquad (6)$$

The reaction is a thermodynamically favorable process, associated with negative reaction enthalpy (−373 kJ/mol) and Gibbs free energy (−334 kJ/mol). A product of this reaction, $Li_2CN_2$, may be then converted to graphite-like $C_3N_4$ carbon nitride via reaction with other compounds, such as $C_3N_3Cl_3$ (Equation 7):

$$\tfrac{2}{3}C_3N_3Cl_3+Li_2CN_2 \rightarrow C_3N_4+2LiCl \qquad (7)$$

Previous conventional methods for the synthesis of $Li_2CN_2$ from lithium carbide ($Li_2C$) and lithium nitride ($Li_3N$) in liquid lithium required a high temperature of 530° C. and long reaction time of 150 hours. In contrast, the synthesis of $Li_2CN_2$ from the reaction of $CO_2$ and $Li_3N$ according to certain embodiments (Equation 6) is fast at about 350° C. or above (see Example 1). The reaction between $Li_2CN_2$ and $C_3N_3Cl_3$ typically uses a high temperature of about 500° C. and several days to finish. In certain embodiments, provided are methods of converting $CO_2$ to carbon nitride, wherein the methods comprise first synthesizing $Li_2CN_2$ from the reaction between $CO_2$ and $Li_3N$ (Equation 6). Then, the reaction may be cooled to about room temperature. Then $C_3N_3Cl_3$ powder may be added to the solid products obtained in the first reaction (Equation 6). The compounds may be loaded into an ampoule, suitably made of silica. The reaction may be heated to a temperature of about 100° C. to about 350° C. for about 10-24 hours. The temperature may then be raised to a temperature of about 500° C. and maintained at this temperature for about 1 to about 3 weeks. The reaction may then be cooled to room temperature for about 2 to about 3 days, with the product comprising a carbon nitride via the second reaction (Equation 7).

In other embodiments, $Li_2CN_2$ (obtained in the first step, Equation 6) may be separated from other components before the second reaction (Equation 7) takes place. The separation methods may be based on the different solubility of $Li_2CN_2$ and other components in solvents, as detailed above. The separated $Li_2CN_2$ may then be mixed with $C_3N_3Cl_3$ and subjected to the second reaction as described above to form carbon nitrides.

Besides lithium cyanamide ($Li_2CN_2$), the reaction between $CO_2$ and $Li_3N$ (Equation 6) can produce other products, such as $C_xN_y$, $Li_2O$, and $Li_2CO_3$. Separation of $Li_2CN_2$ from $Li_2O$ and $Li_2CO_3$ may be difficult. Although carbon nitrides do not directly affect the reaction between $Li_2CN_2$ and $C_3N_3Cl_3$ to $C_3N_4$, the other products such as $Li_2O$ and $Li_2CO_3$ may indirectly affect the reaction. For example, $Li_2O$ may compete with $Li_2CN_2$ for reaction with $C_3N_3Cl_3$.

The obtained $C_3N_4$ carbon nitrides may be subjected to various characterizations to evaluate their compositions and structures, and the techniques may be as those described above for carbon nitrides obtained directly from the $CO_2$ and $Li_3N$ reaction. The carbon nitrides from the direct synthesis and the indirect synthesis may be compared, which may permit verification of the carbon nitrides generated in the second reaction.

Figure 5:
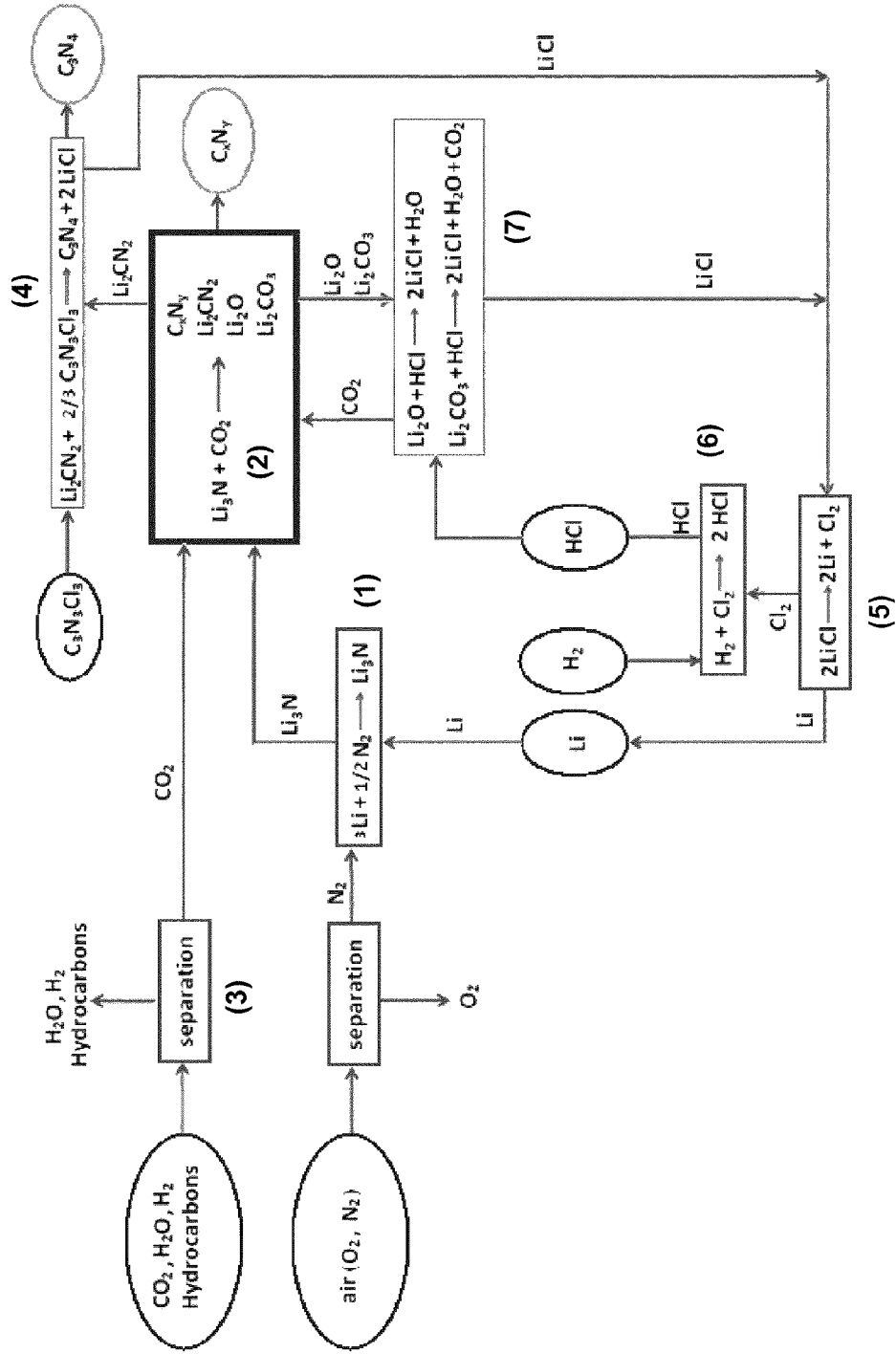
FIG. 5 is a flow diagram illustrating a system for generating carbon nitrides using both direct and indirect processes.

In other embodiments, the invention provides a system for generating carbon nitrides from air and an initial mixture comprising $CO_2$, water, $H_2$, and hydrocarbons, using both the direct and indirect processes. A suitable system is illustrated in FIG. 5 and comprises the processes described above (Equations 6 and 7) and detailed in Examples 1 to 4. For example, $N_2$ may be separated from air and reacted in reactor 1 with Li to yield $Li_3N$ according to Equation 10:

$$3Li + \tfrac{1}{2}N_2 \rightarrow Li_3N \tag{10}$$

$Li_3N$ may then be transferred to reactor 2 to react with $CO_2$ to form $C_xN_y$, $Li_2CN_2$, $Li_2O$, and $Li_2CO_3$ (as in Equations 5 and 6 described above). For this reaction, $CO_2$ may be supplied from reactor 3 where $CO_2$ is separated from $H_2O$, $H_2$, and hydrocarbons. $Li_2CN_2$ from this reaction of $CO_2$ and $Li_3N$ may be separated and transferred to reactor 4 for reaction with $C_3N_3Cl_3$ (according to Equation 7 described above) to produce the desired $C_3N_4$. Also produced from this reaction in reactor 4 may be LiCl, which may be transferred to reactor 5. In reactor 5, LiCl may be broken down into Li and $Cl_2$ according to Equation 11:

$$2LiCl \rightarrow 2Li + Cl_2 \tag{11}$$

Li herein produced may be transferred to reactor 1 for reaction with $N_2$, while $Cl_2$ from this reaction may be transferred to reactor 6. In reactor 6, $H_2$ and $Cl_2$ may be reacted to form HCl according to Equation 12:

$$H_2 + Cl_2 \rightarrow 2HCl \tag{12}$$

This HCl may be transferred to reactor 7. In reactor 7, $Li_2O$ and $Li_2CO_3$ (from reactor 2) may each be reacted with HCl to form LiCl, $CO_2$, and $H_2O$ according to Equations 13 and 14:

$$Li_2O + HCl \rightarrow 2LiCl + H_2O \tag{13}$$

$$Li_2CO_3 + HCl \rightarrow 2LiCl + H_2O + CO_2 \tag{14}$$

The $CO_2$ from reactor 7 may be separated and transferred to reactor 2 for further reaction with $Li_3N$. LiCl from reactor 7 may be combined with the LiCl from reactor 4 for separation into Li and $Cl_2$ in reactor 5. As such, with input of air ($O_2$ and $N_2$), $C_3N_3Cl_3$, $H_2$, and a mix of $CO_2$, $H_2O$, $H_2$, and hydrocarbons, a system may be used to generate $C_3N_4$.

Phase Transformation of Carbon Nitrides at High Pressures and Temperatures

Reaction between $CO_2$ and metal nitrides can produce a large amount of carbon nitrides, and the large amount may be suitable for high pressure and high temperature experiments. Accordingly, further provided are methods to carry out the phase transformation of carbon nitrides between various phases (including amorphous) at high pressures and high temperatures.

The most stable form of carbon nitrides possesses graphite-like structure. In contrast, super-hard materials include metastable phases, which may be obtained under specific conditions. Therefore, phase transformations of graphite-like carbon nitrides at high pressure and high temperature may be necessary for the synthesis of super-hard carbon nitrides. At pressures of about 5 GPa, phase transition from one graphite form of $C_3N_4$ (P-6m23 polymorph) to another graphite form of $C_3N_4$ (p-type), which differ in planar stacking and character of C—N planar bonds, may be observed. At pressures of about 12 GPa, phase transition from graphitic $C_3N_4$ to a cubic form of $C_3N_4$ may be observed. At very high pressures of about 80 GPa, phase transition from graphitic $C_3N_4$ to β-structure may be observed. A diamond anvil cell may be used as a reactor for the phase transformation of carbon nitrides obtained from the above direct and indirect processes (Equations 5, 6, and 7). High pressures of about 1-150 GPa, about 1-100 GPa, or 10-100 GPa may be employed for the phase transformation process. High temperatures of about 1000° C.-3000° C., about 1500° C.-2800° C., about 2000° C.-2500° C., or about 2500K, may be employed for the phase transformation process. In-situ x-ray diffraction using monochromatic synchrotron radiation source may be used to monitor phase transformations.

Use of Resulting Carbon Nitrides

The resulting carbon nitrides may be used in applications such as super-hard materials, semiconductors, adsorbents, sensors, catalysts, and engineering materials. Graphite-like carbon nitrides may be a precursor to prepare various nanostructured materials. Carbon nitrides and nitrogen-doped carbons may have use as metal-free organocatalysts, as components of fuel cell electrodes, and utility in light-emitting and chemical sensor applications. Specifically, amorphous graphite-like carbon nitrides may have great potential in applications such as catalysis, gas storage, lubrication, and biomolecule adsorption. They can also be used as precursors for the synthesis of crystal carbon nitrides.

While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope, and concept of the invention.

It is to be understood that the invention is not limited in its application to the details of construction and the arrangement of components set forth in the following description. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. As used in this specification, the singular forms "a," "an," and "the" include plural referents unless the content clearly dictates otherwise. It should also be noted that the term "or" is generally employed in its sense including "and/or" unless the content clearly dictates otherwise. All publications, patents, and patent applications are herein expressly incorporated by reference in their entirety for all purposes to the same extent as if each individual publication or patent application was specifically and individually incorporated by reference. In case of conflict between the present disclosure and the incorporated patents, publications, and references, the present disclosure should control. It also is specifically understood that any numerical range recited herein includes all values from the lower value to the upper value, i.e., all possible combinations of numerical values between the lowest value and the highest value enumerated are to be considered to be expressly stated in this application. For example, if a concentration range is stated as 1% to 50%, it is intended that values such as 2% to 40%, 10% to 30%, or 1% to 3%, etc., are expressly enumerated in this specification. If a concentration range is "at least 5%," it is intended that all percentage values up to and including 100% are also expressly enumerated. These are only examples of what is specifically intended.

The following Examples are provided to assist in a further understanding of the invention. The particular materials, methods, and conditions employed are intended to be illustrative of the invention and are not limiting upon the scope of the invention.

EXAMPLES

Example 1

Figure 2:
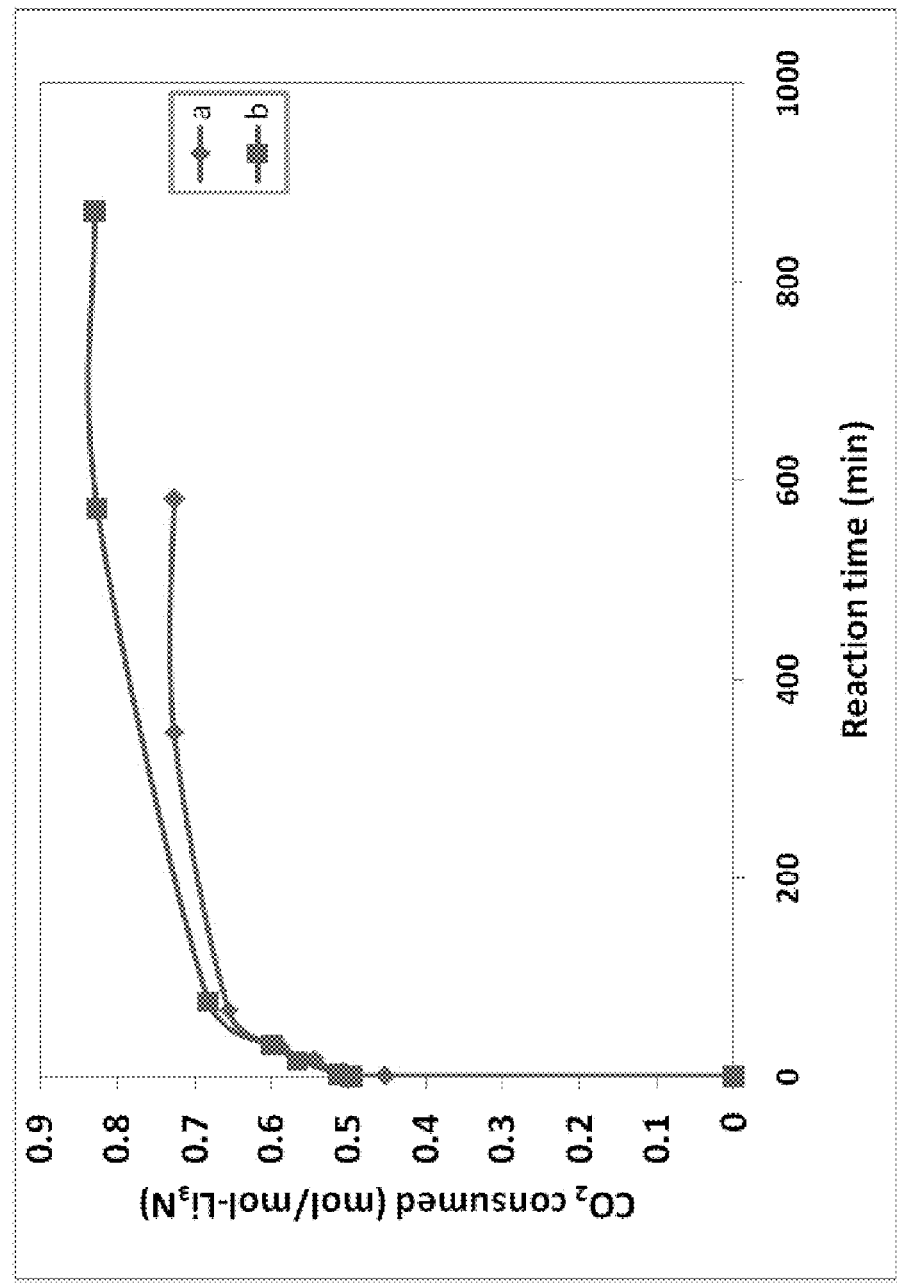
FIG. 2 is a graph showing the relationship between amount of $CO_2$ consumed by $Li_3N$ and reaction time (a) at 350° C. and (b) at 380° C. (initial pressure=14 atm).

Synthesis of Carbon Nitride and Lithium Cyanamide from $CO_2$ and $Li_3N$ 0.5 g $Li_3N$ was loaded in a reactor (a stainless steel tube with an inside diameter of 4 mm). Before the test, the solid sample was subjected to vacuum and heated to a selected temperature. The $CO_2$ pressure change during reaction was measured with a digital pressure gauge, which was used to calculate the amount of consumed $CO_2$. As shown in FIG. 2, the reaction between $Li_3N$ and $CO_2$ was very fast. The amount of consumed $CO_2$ was greater at 380° C. than at 350° C. Furthermore, the in-situ thermocouple measurement showed that the reaction was exothermic.

Figure 3:
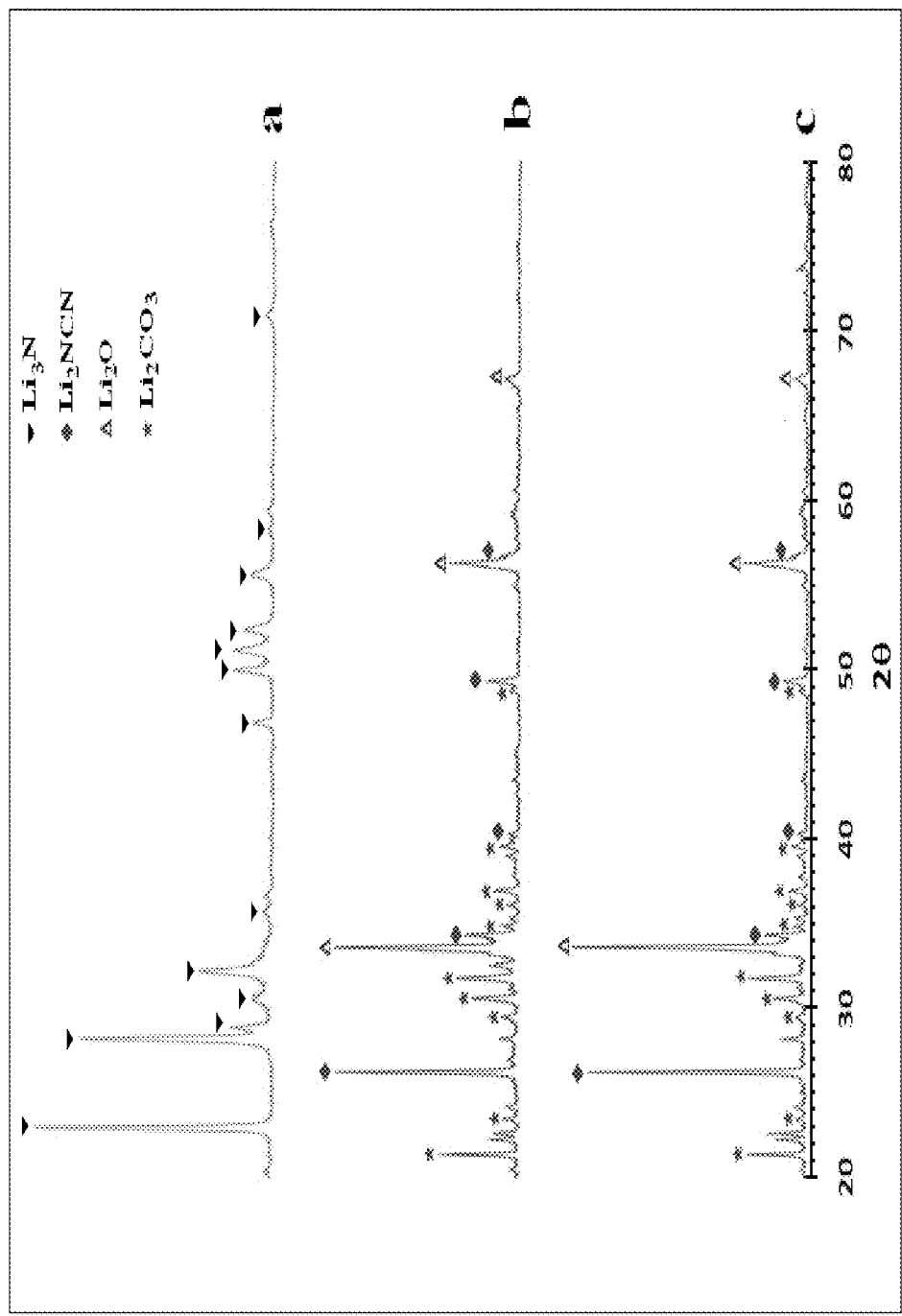
FIG. 3 shows X-ray diffraction patterns of solid materials (a) $Li_3N$ before the reaction, (b) products from the reaction between $Li_3N$ and $CO_2$ at 380° C.; and (c) products from the reaction between $Li_3N$ and $CO_2$ at 350° C.
Figure 4:
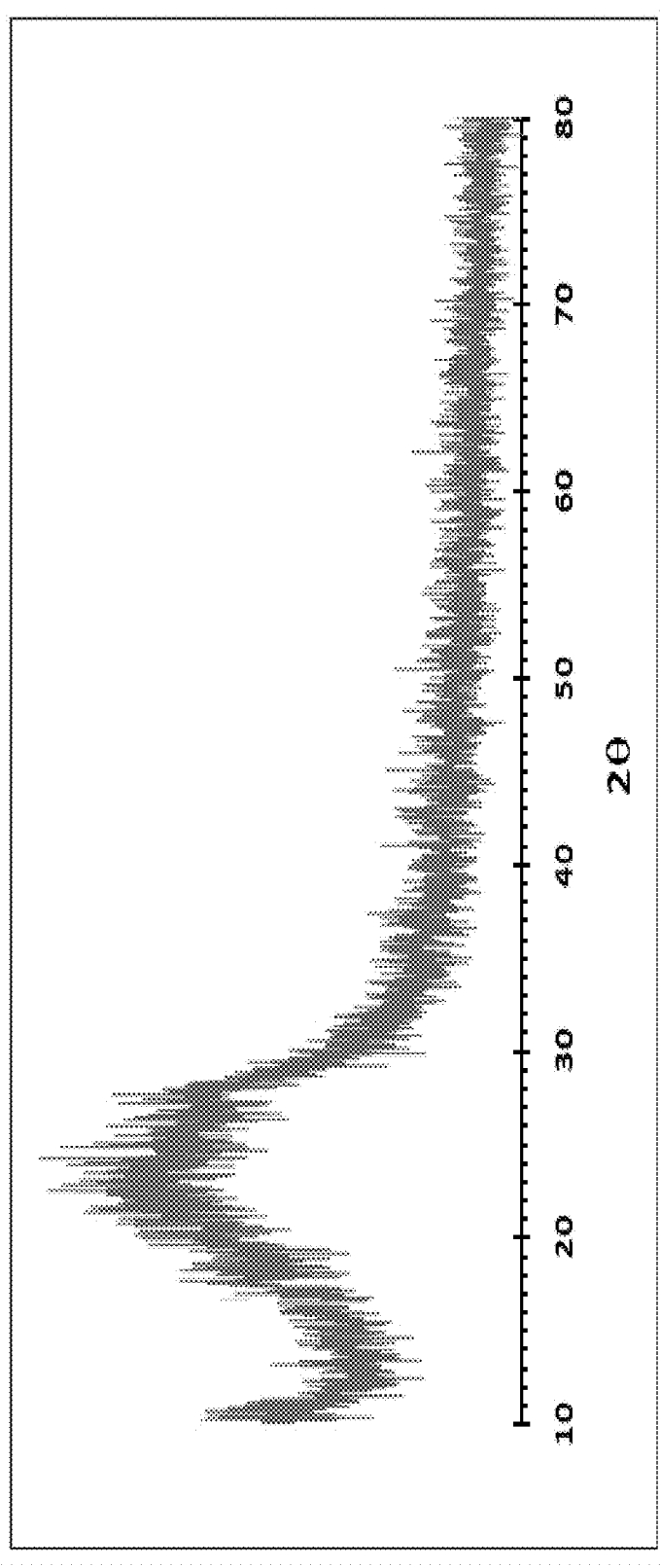
FIG. 4 is an X-ray diffraction pattern of the product from the reaction between $Li_3N$ and $CO_2$ at 380° C., treated by aqueous solution of HCl and water-wash, and finally, dried at 100° C. for several hours.

A light-yellow solid product was obtained from the reaction. X-ray diffraction measurements of the solid product showed that, after the reaction, all peaks corresponding to $Li_3N$ disappeared, whereas many new peaks appeared (FIG. 3). This indicated that all of $Li_3N$ was converted to other compounds by reaction with $CO_2$. The solid product obtained from the reaction had a large peak at 26.1°. After a careful analysis of the x-ray diffraction (XRD) patterns with the Joint Committee on Powder Diffraction Standards (JCPDS) database, it was discovered that the large peak at 26.1° belonged to lithium cyanamide instead of g-$C_3N_4$. Lithium cyanamide with tetragonal structure characteristically has a major diffraction peak at 26.2° and four other strong diffraction peaks at 34.4°, 40.3°, 49.4°, and 56.8°. All five peaks were found in the XRD patterns of the solid product, and the relative intensities perfectly matched those of lithium cyanamide. Another main component in the products was $Li_2O$. Because $Li_2O$ and $CO_2$ are basic and acidic, respectively, they can easily react to form $Li_2CO_3$, and indeed, the XRD patterns showed the existence of $Li_2CO_3$. To examine whether there was amorphous carbon nitride in the solid product, an aqueous solution of HCl was used to dissolve all crystal components, including $Li_2NCN$, $Li_2O$, and $Li_2CO_3$, followed by solid-liquid centrifuge separation (including pure-water wash). After the separation treatment, about 10% of the solid material still remained. The remained solid material was further subjected to XRD-measurement. As shown in FIG. 4, only one very broad peak at about 25° was present and was characteristic of graphite-like amorphous layer structure. Furthermore, element analysis revealed that the solid material consisted of carbon and nitrogen with a C/N ratio of 1.53, i.e, its stoichiometry was $C_{14}N_9$.

The results indicated that firstly, the reaction between $CO_2$ and lithium nitride was exothermic and very fast. Second, the reaction directly produced graphite-like carbon nitride. Third, the exothermic and fast reaction between $CO_2$ and lithium nitride at about 350° C. to about 380° C. constitutes an effective approach to synthesize $Li_2CN_2$.

Example 2

Synthesis of Carbon Nitrides from $CO_2$ and Other Nitrogen Sources

Synthesis of Carbon Nitrides from $CO_2$ and Other Nitrogen Sources

As a comparison, thermodynamic calculations were also completed for reactions to synthesize carbon nitrides from $CO_2$ and other N-containing compounds. The reaction between $CO_2$ and $N_2$ to carbon nitride (with perfect $C_2N_2$ stoichiometry) was expressed as Equation 8:

$$3CO_2(g)+2N_2(g) \rightarrow C_3N_4(s)+2O_2(g) \quad (8)$$
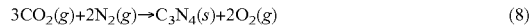

Thermodynamic calculations showed that this reaction has very positive reaction enthalpy ($\Delta H°$=1931-2075 kJ/mol) and Gibbs free energy ($\Delta G°$=1957-2101 kJ/mol). This indicated that it is not a thermodynamically favorable reaction. Indeed, it was observed that no reaction between $N_2$ and $CO_2$ took place even at high temperature of 900° C.

Another simple and useful N-containing compound considered was ammonia ($NH_3$). The reaction between $CO_2$ and $NH_3$ to produce carbon nitride $C_3N_4$ was expressed as Equation 9:

$$3CO_2(g)+4NH_3(g) \rightarrow C_3N_4(s)+6H_2O(s) \quad (9)$$
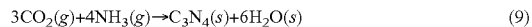

Thermodynamic calculations indicated that this reaction is not thermodynamically favorable, associated with very positive enthalpy ($\Delta H°$=664~808 kJ/mol) and free energy ($\Delta G°$=651~795 kJ/mol). Correspondingly, no $C_3N_4$ was found from the reaction between $CO_2$ and $NH_3$.

Example 3

Direct Process for Synthesis of Carbon Nitrides

A. Preparation of Metal Nitrides

To prepare nanoparticle metal nitrides, metal nitrides ($Li_3N$, $Mg_3N_2$, $Ca_3N_2$, or AlN) will be purchased from the Aldrich Chemical Company. The original materials will be ground by ball-milling method (in argon) to obtain nanoparticles with various sizes. The sizes will be controlled by the milling time and measured by SEM and TEM.

To prepare catalyst-doped metal nitrides, metal nitride powder ($Li_3N$, $Mg_3N_2$, $Ca_3N_2$, or AlN) will be mixed with transition metal (Ni, Pt, Rh or Ru purchased from Aldrich) as catalyst by high speed ball milling (in argon). Catalyst loading will be 0.1~5 wt % and can be changed according to experimental results.

B. Reactions Between $CO_2$ and Metal Nitrides

The reaction between metal nitride and $CO_2$ will be carried out in a stainless steel tube reactor (with an inside diameter of 4~10 mm), located in a furnace. 0.5-2 g metal nitride sample with and without catalyst will be loaded in the reactor. After the solid sample is subjected to vacuum and heated to a selected temperature (25-700° C.), $CO_2$ in a reserve container will be introduced into the reactor. $CO_2$ pressure change during the reaction will be measured with a digital pressure gauge. Furthermore, the test unit will be modified for the installation of an online mass spectrometer to monitor gas composition during the reaction. The combination of pressure change and gas composition will provide information about the amount of consumed $CO_2$ and its change with reaction time, which can facilitate examination of reaction kinetics. Temperatures between 25° C. and 700° C. and pressures between 1 and 100 atm will be selected for the reaction. For reaction temperatures higher than 650° C., a ceramic reactor will replace the stainless steel one.

These experiments will produce the solid materials, particularly carbon nitrides and metal cyanamides. The solid products will be subjected to the further treatment and the composition and structure analyzed as described below.

C. Separation of Carbon Nitrides from Other Components in Solid Products

Based on results described above for Example 1, the solid products will be carbon nitrides, metal cyanamides, metal oxides, and metal carbonates. Except carbon nitrides, all of the solid products can be dissolved in an aqueous solution of HCl. Therefore, the aqueous solution of HCl will be used to separate carbon nitrides from other components with the following approach: (1) the solid materials will be immersed in the solution, followed by centrifuge separation; and (2) the remaining solid will be washed by pure-water, followed by drying at 100° C. for several hours. The remaining solid materials will be carbon nitrides.

D. Composition and Structure Evaluations of Solid Products

Solid products and purified ones will be subjected to the regular X-ray powder diffraction (XRD) measurements for crystal composition and structure evaluations.

Compositions of carbon nitrides (obtained as in Example 3C) will be evaluated by element analysis, including C, N, and O. A PE2400 analyzer with standard ASTM#5291 method will be used.

The composition of the carbon nitrides (obtained as in Example 3C) will also be analyzed by X-ray photoelectron spectroscopy (XPS). The XPS data will also provide structure information, because different types of carbon have different positions in XPS spectra.

Carbon nitrides (obtained as in Example 3C) will further be measured by Fourier Transform Infrared (FTIR) Spectroscopy for structures. Characteristic absorption bands of C—C, C=C, N—C, N=N, C=N, N≡C and N≡N will be employed to evaluate the structures of carbon nitrides.

Example 4

Indirect Process for Synthesis of Carbon Nitrides

A. Synthesis of $C_3N_4$ Carbon Nitrides via Lithium Cyanamide 2 g $Li_3N$ powder will be loaded in a stainless steel reactor (with an inside diameter of 4~10 mm), located in a furnace. After the solid sample is subjected to vacuum and heated to a selected temperature (300~400° C.), $CO_2$ will be introduced into the reactor for several hours. Then, the reactor will be cooled down to room temperature, and the solid products will be mixed with $C_3N_3Cl_3$ (purchased from Aldrich) and loaded into a silica ampoule (inner diameter of 10 mm) that can be sealed. The ampoule will be heated and kept at temperatures between 250° C. and 350° C. for 10-24 h. Afterwards the temperature will be further raised to about 500° C. and remain at this temperature for 1-3 weeks, before the ampoule is cooled to room temperature in 2-3 days. $C_3N_4$ carbon nitride is expected to exist in the solid products.

As an alternative approach, there will be a separation step between the first and second reactions, with subsequent steps being the same as in the first approach described above. The separation step can be described as follows: the solid products, which will be obtained from the first reaction ($CO_2$ and $Li_3N$ reaction), will be immersed in water, followed by centrifuge separation. As a result, the carbon nitrides generated in the first reaction will be removed from the liquid. The dissolved components of $Li_2CN_2$, $Li_2O$ and $Li_2CO_3$ in the solution will be obtained via vaporizing water. The obtained solid material ($Li_2CN_2$, $Li_2O$, and $Li_2CO_3$) will be mixed with $C_3N_3Cl_3$ and subjected to the same second reaction as in the first approach.

B. Separation of $C_3N_4$ Carbon Nitride from Other Components in Solid Products Carbon nitrides (obtained as in Example 4A) will be separated from other components. The procedure will be the same as described in Example 3C. Alternatively, the carbon nitrides can also be separated by pure water as follows: the solid product will be immersed in water, followed by centrifuge separation. Because $Li_2O$ and $Li_2CO_3$ as well as LiCl can be dissolved in pure water, the remained solid material will be carbon nitrides.

C. Composition and Structure Evaluations of Solid Products

The solid materials (obtained as in Example 4A and 4B above) will be subjected to the same characterizations as described in Example 3D. The information obtained from these characterizations will allow one to evaluate the compositions and structures of the products obtained from the second reactions. Furthermore, the results obtained from here and from that described in Example 3D will be compared in order to examine the differences between the carbon nitrides obtained in the first and the second reactions.

Example 5

High Pressure Transformation of Amorphous Carbon Nitrides to Crystal Forms

The pressure- and temperature-induced phase transformation will be examined. A diamond anvil cell (DAC) will be used in the transformation. The experiments will be performed using a High Energy Synchrotron Source. To achieve high-pressure and high-temperature conditions, the sample in a diamond-anvil cell will be heated by a laser. In-situ synchrotron X-ray diffraction measurements will be carried out. In the experiments, carbon nitrides, which will be obtained as described in Examples 3 and 4, will be used as amorphous precursors. Room temperature to 2500 K and 0.1 to 100 GPa will be employed for this experiment. From the primary measurement data, the detailed crystal structures will be analyzed by the Rietveld method. The correlation of the phase structures with pressures and temperatures will allow establishment of phase diagrams, which will be used as a guidance to design a commercial processes.

Thus, the invention provides, among other things, a method of converting carbon dioxide to carbon nitrides by reaction with metal nitrides.

I claim:

1. A method of producing a carbon nitride from carbon dioxide comprising reacting carbon dioxide with a metal nitride to produce a first carbon nitride of formula $C_xN_y$, wherein each of x and y is independently an integer from 1 to 20, wherein the metal nitride comprises $Li_3N$, wherein the reaction between carbon dioxide and the metal nitride further produces $Li_2CN_2$.

2. The method of claim 1, wherein the first carbon nitride comprises $C_3N_4$.

3. The method of claim 1, further comprising reacting the $Li_2CN_2$ with $C_3N_3Cl_3$ to produce a second carbon nitride of formula $C_xN_y$, wherein each of x and y is independently an integer from 1 to 20.

4. The method of claim 3, wherein the second carbon nitride comprises $C_3N_4$.

5. The method of claim 1, further comprising reacting the carbon dioxide with the metal nitride in the presence of a catalyst.

6. The method of claim 5, wherein the catalyst comprises a transition metal.

7. The method of claim 6, wherein the transition metal is at least one of Ni, Rh, Ru, and Pt.

8. The method of claim 1, further comprising:
   a) producing a solid contaminant in the reaction between the carbon dioxide and the metal nitride to form a mixture comprising the solid contaminant and the first carbon nitride;
   b) applying a solvent to the mixture; and
   c) separating the first carbon nitride from the solid contaminant.

9. The method of claim 8, wherein separating comprises centrifugation.

10. The method of claim 8, wherein the solid contaminant comprises metal cyanamide, metal oxide, metal carbonate, or a combination thereof.

11. The method of claim 8, wherein the solvent comprises water.

12. The method of claim 8, wherein the solvent comprises acid.

13. The method of claim 12, wherein the acid comprises HCl.

14. A method of producing a carbon nitride from carbon dioxide comprising:
   a) reacting carbon dioxide with a metal nitride comprising $Li_3N$ to produce a $Li_2CN_2$ and a first carbon nitride of formula $C_xN_y$; and
   b) reacting the $Li_2CN_2$ with $C_3N_3Cl_3$ to produce a second carbon nitride of formula $C_xN_y$, wherein each x and y is independently an integer from 1 to 20.

15. The method of claim 14, wherein the first and second carbon nitrides each comprise $C_3N_4$.

16. The method of claim 14, further comprising reacting the carbon dioxide and the metal nitride in the presence of a catalyst.

17. The method of claim 16, wherein the catalyst comprises a transition metal.

18. The method of claim 17, wherein the transition metal is at least one of Ni, Rh, Ru, and Pt.

19. The method of claim 14, further comprising:
   producing a first solid contaminant in the reaction between the carbon dioxide and the metal nitride of step (a) to form a first mixture comprising the first solid contaminant and the first carbon nitride;
   producing a second solid contaminant in the reaction between the $Li_2CN_2$ and $C_3N_3Cl_3$ of step (b) to form a second mixture comprising the second solid contaminant and the second carbon nitride;
   applying a solvent to the first or second mixture; and
   separating the carbon nitride from the solid contaminant.

20. The method of claim 19, wherein the first or second solid contaminant comprises metal cyanamide, metal oxide, metal carbonate, or a combination thereof.

21. The method of claim 19, wherein the solvent comprises water.

22. The method of claim 19, wherein the solvent comprises acid.

23. The method of claim 22, wherein the acid comprises HCl.

* * * * *